United States Patent [19]

McEachern et al.

[11] Patent Number: 4,791,652
[45] Date of Patent: Dec. 13, 1988

[54] SYNCHRONIZATION OF ASYNCHRONOUS DATA SIGNALS

[75] Inventors: James A. McEachern; Thomas E. Moore, both of Kanata, Canada

[73] Assignee: Northern Telecom Limited, Montreal, Canada

[21] Appl. No.: 58,010

[22] Filed: Jun. 4, 1987

[51] Int. Cl.[4] .............................................. H04C 7/04
[52] U.S. Cl. .................................... 375/111; 375/118; 370/102
[58] Field of Search ............... 375/111, 112, 118, 119, 375/120; 370/102; 328/155, 181

[56] References Cited

U.S. PATENT DOCUMENTS

| 3,830,981 | 8/1974 | Gruber et al. | 370/102 |
| 4,007,421 | 2/1977 | Lien | 375/111 X |
| 4,397,017 | 8/1983 | Rokugo | 370/102 X |

Primary Examiner—A. D. Pellinen
Assistant Examiner—Derek S. Jennings
Attorney, Agent, or Firm—R. John Haley

[57] ABSTRACT

An asynchronous data signal is synchronized by stuffing in dependence upon phase differences between the asynchronous signal and a resultant synchronized signal. The synchronized signal comprises tdm frames each including data bits and a stuffing opportunity bit, and a plurality of frames constitute a superframe in which different frames have different numbers of data bits. To compensate for the biassed timing of stuff requests which would otherwise occur relative to the frame timing in the superframes, the threshold value with which the phase difference is compared to produce the stuff requests is modified with a stepped sawtooth waveform having a period equal to that of the superframe.

15 Claims, 2 Drawing Sheets

SYNCHRONIZATION OF ASYNCHRONOUS DATA SIGNALS

This invention relates to a method of and apparatus for synchronizing an asynchronous data signal to produce a synchronized data signal.

It has long been known to use stuffing techniques in order to produce a data signal, which is synchronized to a local clock frequency, from an incoming data signal which is asynchronous to the local clock frequency. The synchronized data signal can then conveniently be switched or multiplexed and transmitted with other, similarly synchronized, data signals.

The most frequently used stuffing technique is positive stuffing, in which it is assured that the frequency of the synchronized data signal is equal to or greater than the highest possible frequency of the asynchronous data signal, and frequency differences are made up by the insertion of stuff bits. For example, an asynchronous DS1 data signal has a frequency of 1.544 Mb/s±200 b/s, and may be converted by positive stuffing into a synchronized data signal with a frequency of at least 1.5442 Mb/s. Generally, a higher frequency than this is used for the synchronized data signal in order to enable waiting time jitter, which arises as a result of the stuffing process and typically has a frequency component equal to the stuffing frequency, to be subsequently filtered out from the synchronized data signal.

Recently, synchronous communications networks, such as that using the so-called SONET format, have become of increasing importance in the communication of data signals. In such a network various proposals for synchronizing asynchronous data signals, especially asynchronous DS1 data signals, have been made.

In one such proposal, an incoming asynchronous data signal can have a frequency which is either lower or higher than the synchronized data signal frequency, and a synchronizing arrangement is required in order to effect positive or negative stuffing, respectively, to produce a synchronized data signal from the asynchronous data signal. Whereas positive stuffing comprises providing a stuff bit in the synchronized data signal to compensate for a relatively lower asynchronous data signal frequency, negative stuffing comprises using a "spare" bit of the synchronized data signal for transmitting data to compensate for a relatively higher asynchronous data signal frequency.

With this positive/negative stuffing, the synchronized data signal has a waiting time jitter component at a frequency which is equal to the rate of positive or negative stuffing. The closer the asynchronous data signal frequency is to the synchronized data signal frequency, the lower will be the stuffing rate and hence the jitter component frequency, rendering it more difficult to filter out the jitter from the synchronized data signal. This problem can be avoided in the manner described and claimed in McEachern et al. U.S. patent application Ser. No. 876,134 filed June 19, 1986 and entitled "Synchronization of Asynchronous Data Signals". In the invention of that application, threshold values, with which phase differences between writing to and reading from an elastic store are compared to produce stuff requests, are modified in such a manner that additional positive and negative stuffing takes place whereby the stuffing frequency is increased, enabling the resulting jitter to be filtered out using a phase-locked loop.

In another SONET proposal, described in detail below, an incoming asynchronous data signal is subjected only to positive stuffing. In the prior art, it would be appropriate to select an appropriate stuff ratio for this positive stuffing, in well-known manner for achieving an acceptably low level of jitter, and to use this without further concern for jitter. It has been found, however, that following such prior art procedures for the SONET proposal does not result in the anticipated low level of jitter, but rather in an unacceptable higher jitter level. It is believed that this difference stems from the distribution of probabilities that stuffing will take place in particular stuffing opportunities; the prior art techniques inherently assume (although it does not appear to be discussed in the prior art) an equal probability of stuffing for all stuffing opportunities, whereas such an equal probability distribution does not apply to stuffing in the proposed SONET format.

An object of this invention, therefore, is to provide an improved synchronizing method and apparatus in which this problem is reduced or substantially avoided.

According to one aspect this invention provides a method of synchronizing an asynchronous signal to produce a synchronized signal by stuffing the asynchronous signal in dependence upon a stuff request signal produced from a comparison of phases of the asynchronous and synchronized signals, wherein the synchronized signal comprises time division multiplexed frames each including data bits, at least one stuffing opportunity bit, and at least one overhead bit, and a plurality of said frames constitute a superframe in which at least two frames comprise different numbers of data and/or overhead bits, comprising the step of modifying the production of the stuff request signal in dependence upon a waveform having a period equal to that of the superframe thereby to distribute stuffing among said frames in the superframes.

Thus in accordance with the invention a waveform is used to modify the production of stuff requests in such a manner as to compensate for the biassed timing of such requests which would otherwise occur, relative to the frame timing in the superframes, due to the unequal distribution of data and/or overhead bits among the frames. To this end, the waveform is preferably a function of the differences in the number of data and/or overhead bits in the plurality of frames in the superframes, and the number of frames in each superframe.

In an embodiment of the invention described below the frames of the synchronized signal contain, on average, the same number of data bits as the frames of the asynchronous signal. In such a case typically all of the frames contain the same number of overhead bits (e.g. framing information and stuff indication bits), and there are different numbers of data bits in individual frames of the superframe. Considered alternatively, there are a fixed number of overhead bits and a variable number of data bits between successive stuffing opportunity bits.

However, the data bits of the asynchronous signal may be mapped into the synchronized signal format in many different ways. In particular, it may be mapped so that there are a variable number of overhead bits and a fixed or variable number of data bits between successive stuffing opportunity bits, so that different frames in the stuffing superframe comprise different numbers of overhead bits, and possibly also different numbers of data bits.

In the embodiment of the invention described below there is a difference of one between the number of data bits in one of the frames of the superframe and the number of data bits in each other frame of the superframe, and the waveform comprises a generally sawtooth waveform having an amplitude which changes between successive frames by an amount substantially equal to a phase difference of one bit divided by the number of frames in each superframe. As described below there are four frames in each superframe, one of the frames containing one more data bit than each other frame. The waveform is in this case a stepped sawtooth waveform having a period of 4 frames and having an amplitude which is stepped between consecutive frames by an amount equivalent to a phase difference of one quarter of a bit.

Conveniently a phase difference between the asynchronous and synchronized signals is compared with a threshold value and the step of modifying the production of the stuff request signal comprises modifying the threshold level or the phase difference in dependence upon said waveform.

This invention also provides synchronizing apparatus comprising: means responsive to a stuff request signal for stuffing an asynchronous data signal to produce a synchronized data signal comprising time division multiplexed frames each including data bits, at least one stuffing opportunity bit, and at least one overhead bit, a plurality of said frames constituting a superframe in which at least two frames contain different numbers of data and/or overhead bits; means for producing the stuff request signal in dependence upon the relative phases of the asynchronous and synchronized data signals; and modifying means for modifying the production of the stuff request signal in dependence upon a waveform having a period equal to that of the superframe thereby to distribute stuffing among said frames in the superframes.

The invention will be further understood from the following description with reference to the accompanying drawings, in which.

Figure 1:
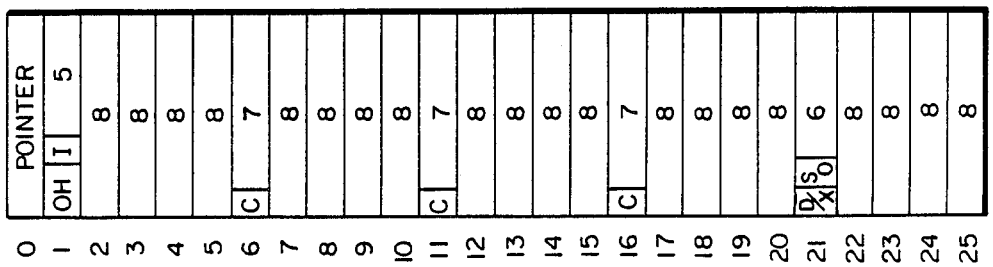
FIG. 1 is a diagram illustrating a proposed SONET format for accommodating an asynchronous DS1 data signal in a synchronized tributary.

Referring to FIG. 1, a proposed SONET format for mapping an asynchronous DS1 data signal into a synchronized tributary data signal, referred to below for simplicity as a tributary, is illustrated. Such a tributary consists of 26 8-bit words which are numbered 0 to 25 in FIG. 1, and may be multiplexed with other such tributaries in a synchronous, word-interleaved manner for example as described in Graves et al. U.S. Pat. No. 4,797,264 issued Aug. 16, 1988 and entitled "Method of Multiplexing Digital Signals". More particularly, a plurality of such tributaries may be multiplexed together to form one frame of a so-called STS-1 signal in the SONET format. Accordingly, and for consistency, the contents of the 26 words represented in FIG. 1 are referred to as one frame of tributary data.

The tributary frame contains overhead information including a pointer as word 0, and other overhead information OH as bits 1 and 2 of word 1, with which the present invention is no concerned and accordingly which are not further discussed here. The third bit of word 1, referred to as an I bit, is an information bit which identifies tributary frames. For example the I bit is a binary 1 for three consecutive tributary frames and is a binary 0 for the next, or fourth, tributary frame, this pattern repeating cyclically for successive groups of tributary frames thereby defining a 4-frame superframe. This 4-frame stuffing superframe format is assumed for the remaining description, but it should be understood that other formats may similarly be used.

The first bit, marked D/X, of word 21 in each tributary frame is used as a data bit in every fourth tributary frame, when the bit I is a binary 0, and is discarded or is used for other purposes in the other three frames of each stuffing superframe. The second bit, marked S0, of word 21 is a stuffing opportunity bit, which is used as a data bit or a stuffed data bit to provide the desired positive stuffing. The use of the S0 bit in each tributary frame is represented by the first bit of words 6, 11, and 16 of the frame, which are redundantly provided for reliability and which are referred to as stuff indication or C bits corresponding to nomenclature used for DS-3 signals. The C bits all have the same binary value (so that a majority decision can be reliably reached after transmission even in the presence of single bit errors) representing that the S0 bit is a data bit or a stuffed bit.

FIG. 1 illustrates the number of bits remaining in each of words 1, 6, 11, 16, and 21, which together with the eight bits of each of the remaining 20 words constitute a total of 192 bits. If the S0 bit is used as a data bit in each frame, there are thus 193 data bits in each of 3 frames, and 194 data bits in every fourth frame, for an average of 193.25 data bits per frame. If the S0 bit is used as a stuffed data bit in each frame, there are 192 data bits in each of 3 frames. and 193 data bits in every fourth frame, for an average of 192.25 data bits per frame. In practice, nominally the 193 bits per frame of an asynchronous DS1 data signal will be mapped into the tributary frame, with an arbitrary orientation, with one S0 bit in every four tributary frames used as a stuffed bit and the other three S0 bits in every four tributary frames used as data bits, to achieve an average of 193 data bits per frame and a nominal stuff ratio of 0.25.

Figure 2:
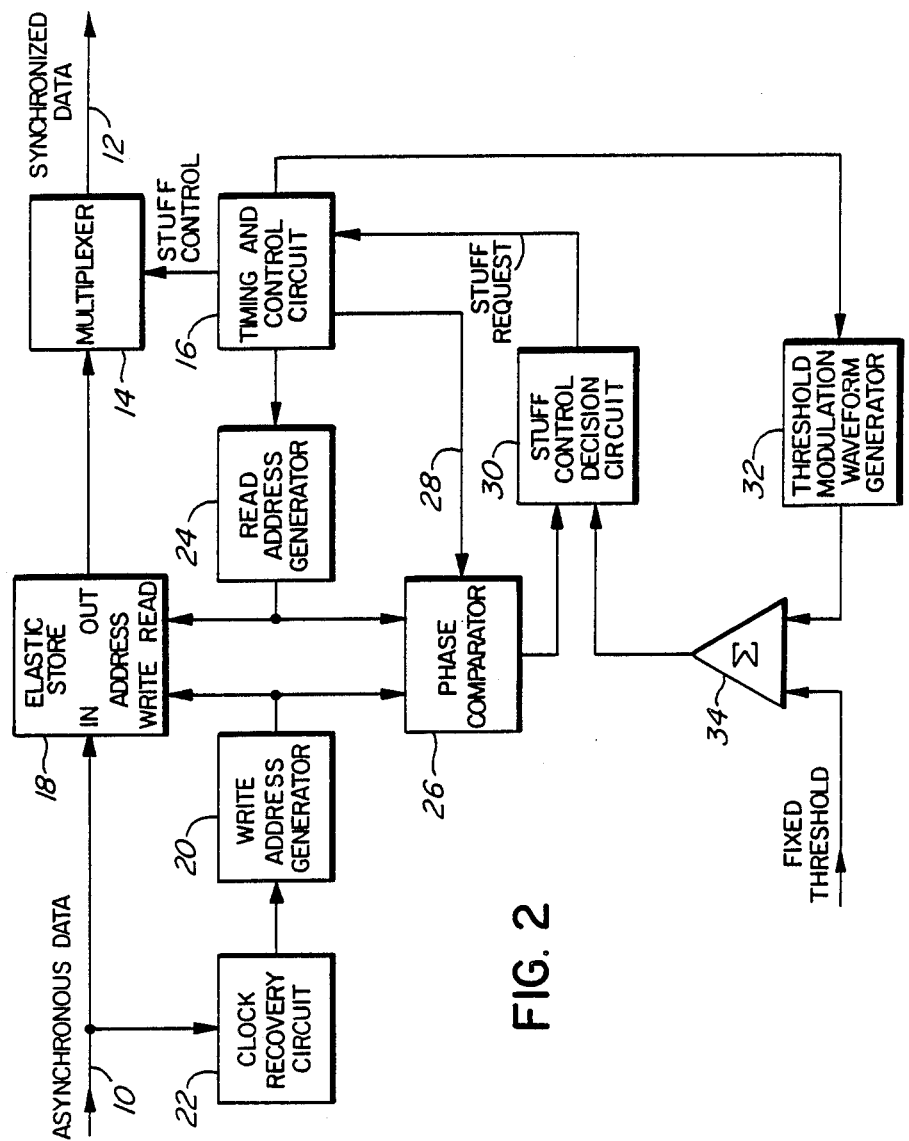
FIG. 2 is a block diagram illustrating a synchronizing arrangement in accordance with an embodiment of this invention.

FIG. 2 illustrates a synchronizing arrangement which may be used in accordance with the invention for converting an asynchronous DS1 data signal incoming on a line 10 into the synchronized tributary data on a line 12. A multiplexer 14 effects positive stuffing under the control of stuff control signals supplied thereto by a timing and control circuit 16, and also multiplexes the other overhead information shown in FIG. 1 into the tributary data on the line 12.

The asynchronous data is written into a cyclic or elastic store 18 at addresses supplied by a write address generator 20 supplied with a recovered clock signal produced by a clock recovery circuit 22 from the asynchronous data bit stream on the line 10, and is read from the store 18 to the multiplexer 14 under the control of a read address generator 24 supplied with a gapped clock signal from the circuit 16. In order to determine when a stuff is necessary, a phase comparator 26, when enabled by the circuit 16 via a line 28, compares the relative phases of writing to and reading from the store 18, and supplies a comparison signal to a stuff control decision circuit 30. Because the relative writing and reading phases will vary considerably during each frame in view of the presence of the overhead information on the tributary data as shown in FIG. 1, the phase comparator 26 is enabled by the circuit 16 to make a phase comparison, for example only once in each frame, at the same point in consecutive frames.

The stuff control decision circuit 30 produces stuff requests on the basis of the phase comparison relative to a threshold level. Traditionally, this would have been a fixed threshold level as described below. In the present invention, however, this threshold level is cyclically varied or modulated with a waveform having the same period as the stuffing superframe, for the reasons explained fully below. Accordingly, a threshold modulation waveform generator 32 is provided, synchronized by the circuit 16, to generate this waveform, which is summed with, and hence modifies, a fixed threshold in a summer 34, the resultant modulated threshold being supplied to the circuit 30 for comparison with the phase comparator output signal.

The problem which the present invention addresses is now described with reference to FIG. 3, which is a diagram illustrating as a function of time a net relative phase signal which corresponds to the phase difference detected by the phase comparator 26, shown as a solid line 36, for the case of a fixed, constant amplitude, threshold level, as would traditionally have been used in synchronizing arrangements, shown as a broken line 38. It should be appreciated that the line 36 does not represent the actual output signal of the phase comparator in view of the cyclical relative phase changes which take place within each frame and the consequent cyclical enabling of the comparator, but the line 36 does represent the relative phase difference between writing to and reading from the store 18 from one frame to the next, hence the term "net relative phase" is used.

Figure 3:
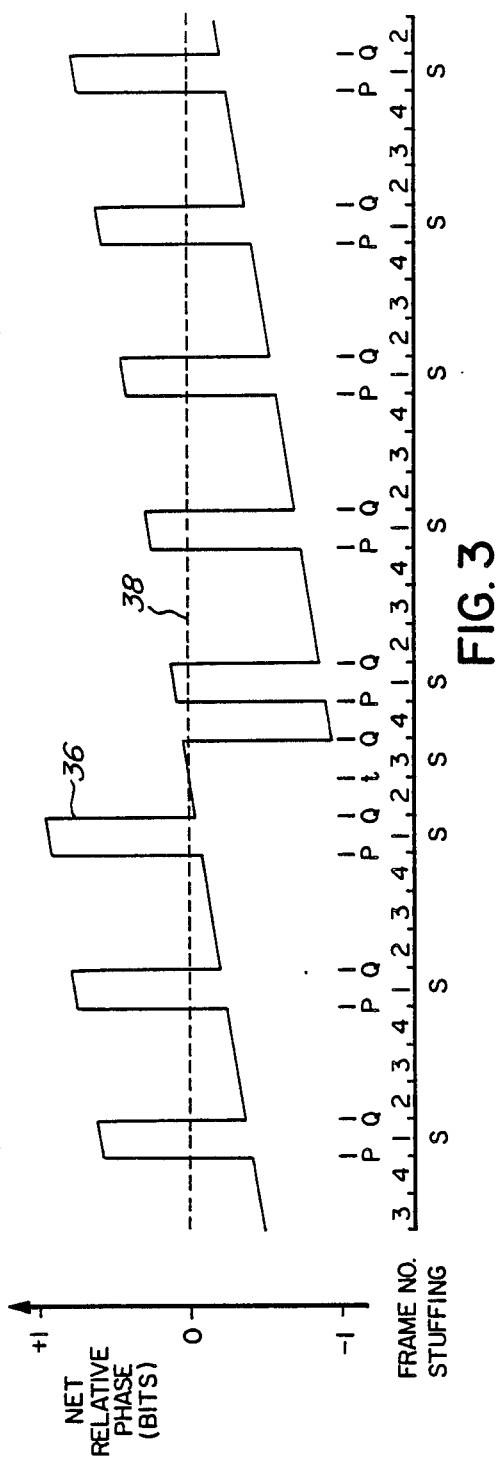
FIGS. 3 and 4 are diagrams illustrating phase relationships and stuffing, with reference to which the problem addressed by this invention and its solution by the embodiment of FIG. 2 are explained.

At the bottom of FIG. 3, frame numbers in the stuffing superframe are shown, thereby illustrating the time scale of the drawing, and those frames in which a stuff takes place are identified by a letter S in a line marked "STUFFING". Frame 4 in each stuffing superframe sequence is assumed to contain the data bit as the first bit in word 21, and accordingly there is a positive phase change of 1 bit shown in the line 36 at the end of each frame number 4, at times marked P in FIG. 3. In response to each stuffed bit, a negative phase change of 1 bit is shown in the line 36 at the end of the frame in which the stuff takes place, at times marked Q. The line 36 has an overall (much exaggerated) positive slope, corresponding to the asynchronous DS1 data signal having an actual frequency which is slightly less than its nominal frequency of 1.544 Mb/s, so that for synchronization the actual stuff ratio, averaged over a long period of time, is slightly more than the nominal stuff ratio of 0.25.

Each time that the line 36 crosses above the threshold level 38, the stuff control decision circuit produces a stuff request to cause a stuffed bit at the next stuffing opportunity, i.e. in the next frame, to cause the line 36 to cross back below the level 38. With the exception of the crossing at a time t, due to the slope of the line 36, each crossing above the level 38 occurs at a time P due to the extra data bit in each fourth frame, so that stuffing takes place in each case in frame number 1. Only in the frame following the time t does this situation change, with a stuff taking place in this example in frame number 3.

Thus FIG. 3 illustrates that the long-term average stuff ratio of nominally 0.25 is misleading, and that in fact the nominal stuff ratio is substantially 1 for each frame number 4 and 0 for each other frame. The slope of the line 36 gives rise to crossings such as at the time t, with consequent extra (or, in the case of an incoming asynchronous signal having a frequency above the nominal frequency, omitted) stuffs at a low frequency, giving rise to an unacceptable jitter component at such a low frequency.

Figure 4:
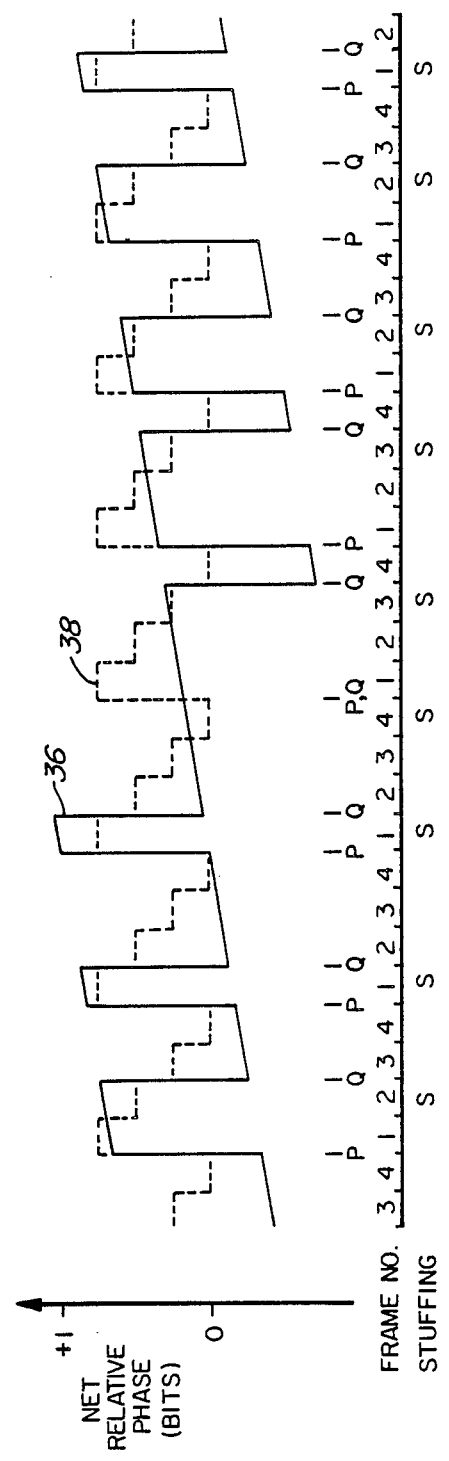

FIG. 4 shows, in a manner and using refereces similar to FIG. 3, how the invention avoids this problem. In this case the threshold level is modulated with a stepped waveform having a period equal to that of the stuffing superframe, the steps corresponding to relative phase differences of three-quarters, half, one-quarter, and zero bits in frame numbers 1, 2, 3, and 4 respectively.

As in FIG. 3, at times marked P and Q there are positive and negative, respectively, phase changes each of 1 bit. At one time, marked P,Q, these changes cancel one another so that the line 36 is not stepped at this time. In contrast to the situation shown in FIG. 3, in FIG. 4 the stepped nature of the threshold level 38 means that the line 36 does not consistently cross above the level 38 at each time P, and so stuffing does not consistently take place in frame number 1. On the contrary, stuffing now takes place in a variable manner in various frames of the stuffing superframes, but at the same average rate. The redistribution of stuffing among the stuffing opportunities more accurately corresponds to the traditionally accepted characteristics for the chosen nominal stuff ratio of 0.25.

More particularly, whereas the stuffing represented in FIG. 3 produces a jitter component at a relatively high frequency, easily removed by filtering in a phase locked loop, due to the periodic stuffing in each frame number 1, and a jitter component at a relatively low frequency, which is very difficult to remove, due to the overall slope of the line 36, in contrast the stuffing represented in FIG. 4 produces significant jitter components only at relatively high frequencies, which are easily removed to leave an acceptably jitter-free signal.

From the above description, it can be seen that the waveform generator 32 can easily produce the stepped sawtooth waveform shown in FIG. 4 in synchronism with the stuffing superframe, and can simply be in the form of a counter, with a digital-to-analog converter if the summer 34, comparator 26 and circuit 30 are implemented using analog components (these may instead be implemented using digital techniques). Alternatively, however, the generated waveform may be a more linerar sawtooth waveform, or some other waveform consistent with the object to vary the frames in which stuffing takes place in the manner described above. Furthermore, the amplitude of the waveform may be changed from that described above. Different waveforms may, in particular, be appropriate for different synchronized data formats, the waveform period in any event corresponding to that of the stuffing superframes.

Although the invention has been described above in relation to positive stuffing of an asynchronous DS1 data signal, it is also applicable to negative stuffing and to the synchronization of signals with other bit rates and formats, in particular DS1C, DS2, and European 2.048 Mb/s data signals.

Furthermore, it should be appreciated that the principles of this invention may be applied either alone or in combination, especially in the case of +/−/0 stuffing, with the principles described in the McEachern et al. patent application already referred to. If the principles are combined, it should be noted that the threshold level with which the monitored phase difference is compared to produce stuff requests will be subject to the sum of two modifying waveforms, namely one as described above with a period equal to that of the stuffing superframes, and one as described in the McEachern et al. application which typically will have a different frequency.

It should also be noted that, although as described above the threshold level is modified by the described waveform, alternatively the output of the phase comparator may be modified in a complementary manner to achieve the same results.

Numerous other modifications, variations, and adaptations may be made to the described embodiment without departing from the scope of the invention as defined in the claims.

What is claimed is:

1. A method of synchronizing an asynchronous signal to produce a synchronized signal by stuffing the asynchronous signal in dependence upon a stuff request signal produced from a comparison of phases of the asynchronous and synchronized signals, wherein the synchronized signal comprises time division multiplexed frames each including data bits, at least one stuffing opportunity bit, and at least one overhead bit, and a plurality of said frames constitute a superframe in which at least two frames comprise different numbers of data and/or overhead bits, comprising the step of modifying the production of the stuff request signal in dependence upon a waveform having a period equal to that of the superframe thereby to distribute stuffing among said frames in the superframes.

2. A method as claimed in claim 1 wherein said waveform is a function of the differences in the number of data bits in the plurality of frames in the superframe and the number of frames in each superframe.

3. A method as claimed in claim 1 wherein there is a difference of one between the number of data bits in one of the frames of the superframe and the number of data bits in each other frame of the superframe, and the waveform comprises a generally sawtooth waveform having an amplitude which changes between successive frames by an amount substantially equal to a phase difference of one bit divided by the number of frames in each superframe.

4. A method as claimed in claim 3 wherein the waveform is a stepped sawtooth waveform.

5. A method as claimed in claim 3 wherein in each superframe said one of the frames contains one more data bit than each other frame.

6. A method as claimed in claim 1 wherein a phase difference between the asynchronous and synchronized signals is compared with a threshold value and the step of modifying the production of the stuff request signal comprises modifying one of the threshold level and the phase difference in dependence upon said waveform.

7. A method as claimed in claim 1 wherein there are four frames in each superframe.

8. A method as claimed in claim 3 wherein there are four frames in each superframe.

9. Synchronizing apparatus comprising:
means responsive to a stuff request signal for stuffing an asynchronous data signal to produce a synchronized data signal comprising time division multiplexed frames each including data bits, at least one stuffing opportunity bit, and at least one overhead bit, a plurality of said frames constituting a superframe in which at least two frames contain different numbers of data and/or overhead bits;
means for producing the stuff request signal in dependence upon the relative phases of the asynchronous and synchronized data signals; and
modifying means for modifying the production of the stuff request signal in dependence upon a waveform having a period equal to that of the superframe thereby to distribute stuffing among said frames in the superframes.

10. Apparatus as claimed in claim 9 wherein the means for producing the stuff request signal comprises phase comparison means, for comparing the relative phases of the asynchronous and synchronized data signals to produce a phase difference signal, and means for comparing the phase difference signal with a threshold value to produce the stuff request signal, and the modifying means comprises means for changing said phase difference signal or said threshold value in dependence upon said waveform.

11. Apparatus as claimed in claim 10 wherein the modifying means comprises means for generating a signal having a generally sawtooth waveform, constituting said waveform, with a period equal to that of the superframe.

12. A memthod of synchronizing an asynchronous signal to produce a synchronized signal by stuffing the asynchronous signal in dependence upon a stuff request signal produced from a comparison of phases of the asynchronous and synchronized signals, wherein the synchronized signal comprises time division multiplexed frames each including data bits, at least one stuffing opportunity bit, and at least one overhead bit, and a plurality of said frames constitute a superframe in which at least two frames comprise different numbers of data and/or overhead bits, comprising the step of modifying the production of the stuff request signal thereby to distribute stuffing among said frames in the superframes.

13. A method as claimed in claim 12 wherein the production of the stuff request signal is modified in synchronism with the superframes.

14. Synchronizing apparatus comprising:
means responsive to s stuff rrequest signal for stuffing an asynchronous data signal to produce a synchronized data signal comprising time division multiplexed frames each including data bits, at least one stuffing opportunity bit, and at least one overhead bit, a plurality of said frames constituting a superframe in which at least two frames contain different numbers of data and/or overhead bits;
means for producing the stuff request signal in dependence upon the relative phases of the asynchronous and synchronized data signals; and
modifying means for modifying the production of the stuff request signal thereby to distribute stuffing among said frames in the superframes.

15. Apparatus as claimed in claim 14 wherein the means for producing the stuff request signal comprises phase comparison means, for comparing the relative phases of the asynchronous and synchronized data signals to produce a phase difference signal, and means for comparing the phase difference signal with a threshold value to produce the stuff request signal, and the modifying means comprises means for changing said phase difference signal or said threshold value.

* * * * *